United States Patent [19]

Ohyama et al.

[11] 3,909,441

[45] Sept. 30, 1975

[54] COMPOSITION FOR FORMING ULTRAVIOLET ABSORBING FILTER LAYER

[75] Inventors: Yasushi Ohyama; Hideo Sumitani; Sadayuki Miyazawa, all of Kyoto, Japan

[73] Assignee: Mitsubishi Paper Mills, Ltd., Tokyo, Japan

[22] Filed: Sept. 27, 1972

[21] Appl. No.: 292,713

[30] Foreign Application Priority Data

Sept. 28, 1971  Japan.............................. 46-75624

[52] U.S. Cl. .................... 252/300; 96/69; 96/74; 96/84 R; 96/94 R; 252/316
[51] Int. Cl.² ...................... F21V 9/06; F21V 9/16
[58] Field of Search........... 96/69, 74, 84 R, 84 UV; 252/300

[56] References Cited
UNITED STATES PATENTS

| | | | |
|---|---|---|---|
| 2,534,654 | 12/1950 | Barnes | 252/300 |
| 3,125,535 | 3/1964 | Hoffman | 252/300 |
| 3,580,720 | 5/1971 | Ohyama et al. | 96/84 UV X |

*Primary Examiner*—Richard D. Lovering
*Attorney, Agent, or Firm*—Sughrue, Rothwell, Mion, Zinn & Macpeak

[57] ABSTRACT

A composition for forming an ultraviolet absorbing filter layer comprising a dispersion in a hydrophilic binder of a complex formed between a fluorescent brightening agent containing an anionic group and being diffusible in an aqueous medium and a hydrophilic polymer containing a cationic nitrogen-containing active group. A photographic material containing this layer is also provided.

4 Claims, No Drawings

COMPOSITION FOR FORMING ULTRAVIOLET ABSORBING FILTER LAYER

BACKGROUND OF THE INVENTION

1. Field of the Invention

This invention relates to a composition for forming an ultraviolet absorbing filter layer which is to be provided on a color photographic paper or the like, and to a photographic material containing such a filter layer.

2. Description of the Prior Art

Color photographic papers now commercially available are prepared by coating multi-layers of red-sensitive, green-sensitive and blue-sensitive silver halide emulsions to develop three primary colors, cyan, magenta and yellow, through interlayers or the like, on baryta paper (obtained by coating barium sulfate on the surface of good quality white paper using a hydrophilic binder) or on a resin coated (RC) or polyethylene coated (PE) base (obtained by coating a white polyethylene layer containing titanium oxide particles on the surface of good quality white paper and a transparent polyethylene layer on the back surface by thermal treatment).

In order to increase the light-resistance of the image after developing, many of these conventional color photographic papers contain an ultraviolet absorbing filter layer coated during the manufacture of the photographic paper. Since this ultraviolet absorbing filter layer is used for the purpose of minimizing color fading upon exposure to light of the three dyes, which form color images by absorbing ultraviolet rays which will most affect these three dyes, it may be applied to color films.

Theoretically, the ultraviolet absorbing filter layer is preferabl coated on top of all three color-forming layers so as to protect all of these layers (that is, opposite the base). However, in most commercial products, a layer of an emulsion which is to form a color having the strongest resistance to light among the three dyes is disposed topmost just under an over layer, and the ultraviolet absorbing filter layer is coated just below this dye layer. Since a cyan dye usually exhibits the best light resistance, a layer of cyan dye is usually coated topmost together with an over layer, and the ultraviolet absorbing layer is applied just below it. That is to say, in most of commercial products, a blue-sensitive emulsion to develop yellow and a green sensitive emulsion to develop green are first coated on a base together with an interlayer, then the ultraviolet absorbing filter layer is coated on top of the coated layers, and then a red-sensitive emulsion layer to develop cyan is coated on top of the filter layer, followed by applying an over layer thereon.

Of late, an oil-in-water emulsion formed by dissolving a hydrophobic ultraviolet absorbent in a high-boiling point oil such as di-n-butyl phthalate or tri-o-cresyl phosphate and dispersing the thus formed solution in a gelatin solution has been primarily used as a composition for forming the ultraviolet absorbing filter layer to be used in the above-mentioned way, as is disclosed in Japanese Pat. No. 26187/67 or 29627/69. This composition, however, has defects, one of which is that because of poor solubility of such an ultraviolet absorbent in the oil and its high crystallinity, the ultraviolet absorbent precipitates as crystals upon standing of the resulting emulsion, thus scattering light to render the emulsion turbid and worsening the efficiency of ultraviolet ray absorption. If the ultraviolet absorbent is added to the oil in an amount which does not cause precipitation even at low temperatures, the ultraviolet absorption effect of the entire filter layer is decreased, and it is difficult to obtain the effect of preventing color fading on exposure to light. There has hardly been any ultraviolet absorbent which has a high solubility in the oil and is free from the defect of crystallization. Specifically, there are very few which meet these requirements among the 2-(2-hydroxy-phenyl)-benzotriazoles, the most commonly used ultraviolet absorbents (sold by Geigy of Switzerland under the trademark "Tinuvin") as is described in detail in the specification of Japanese Pat. No. 26187/67.

Another defect of present ultraviolet absorbents is that the amount of oil must be increased as compared with that of the absorbent because it is difficult to dissolve the absorbent in the oil and the absorbent liable to crystallize. If the ultraviolet absorbent is to be coated to an extent which is sufficient to produce the necessary effect of the filter layer, the thickness of the filter layer must be made large, and the amount of the oil droplets in the filter layer increases. Therefore, there is a great tendency that the filter layer will be removed from the photographic material during development as a result of impairment of its physical properties, or, when the filter layer is coated topmost, the luster of the surface is lost after drying.

It is also known to render the ultraviolet absorbent water-soluble, and non-diffusible to a binder layer which forms a photographic layer, such as gelatin, polyvinyl alcohol or polyacrylamide, and then to disperse the absorbent in such a binder layer. One prior technique of this type is the Fischer method in which a color coupler is rendered non-diffusable to an emulsion, and then dispersed in the emulsion. Another example is a method wherein a long-chain alkyl group and an anionic group, such as a sulfonic acid or carboxylic acid group, are introduced into the molecules of the ultraviolet absorbent, this method being based on an application of the means of rendering the coupler non-diffusible in the manufacture of Agfa-type color couplers. In employing an ultraviolet absorbent of the thiazolidine type, such as sodium salt of 5-(2,4-disulfobenzylidene)-3-cetyl-2-phenylimino-4-thiazolidone, this method is useful. When the ultraviolet absorbent rendered non-diffusible to the binder is incorporated into the binder layer, the resulting emulsion is more stable than an emulsion obtained by dissolving a sulfone group-free thiazolidone of the same skeleton in an oil and dispersing the solution in the binder layer. This is clearly seen from the statement at page 7 of the specification of Japanese Pat. No. 26107/67. Such an ultraviolet absorbent of the thiazolidine type, however, has the defect that it tends to be colored yellow because the long wavelength end (400–420 m$\mu$) of absorption is not sharply cut.

On the other hand, many components conventionally known as fluorescent brightening agents will absorb light rays of a wavelength of about 500 to 590 m$\mu$, and the long wavelength end of absorption is generally sharply cut, showing an effectiveness as an ultraviolet absorbent. In addition, since these compounds emit fluorescence, they increase the whiteness of photographic paper and therefore are considered to be more effective. However, known fluorescent brightening agents are unstable to ultraviolet rays and tend to be decomposed and colored, or do not show sufficient absorption of ultraviolet rays. Furthermore, the direct dyeability of these known fluorescent brightening agents towards hydrophilic binders generally used in the manufacture of a photographic material, such as gelatin or polyvinyl alcohol, is insufficient. If the amount of the fluorescent brightening agent to be added is large, the brightening agent mostly flows out during the development of the photographic material, especially during its rinsing, and therefore does not serve to prevent color fading of the resulting print. Thus, known anionic fluorescent brightening agents have not been used for the production of an ultraviolet absorbing filter in a color photographic paper.

However, since these commercially available fluorescent brightening agents intended for treating fibers mostly possess an anionic group such as a sulfone group, as in many dyes, they have the ability to form complexes with polymers containing a cationic nitrogen-containing active group.

SUMMARY OF THE INVENTION

The inventors of the present invention have found that when a polymer containing a cationic nitrogen-containing active group is mixed in a suitable amount with a photographic binder such as gelatin and the mixture is coated and dried to form a photographic layer, followed by treating this layer with an aqueous solution of an anionic fluorescent brightening agent, or when the anionic fluorescent brightening agent is first combined with such a cationic polymer and then the combined product is mixed with the binder layer, the fluorescent brightening agent forms a complex with the cationic polymer. Thus, even when the photographic layer after drying is washed with water, the fluorescent brightening agent no longer diffuses and escapes.

In the photographic industry, it has been believed that the fluorescence (blue to purple) which the fluorescent brightening agent emits upon exposure to ultraviolet rays is harmful to photographic emulsions.

It is true that in color photographic materials for photographing purposes, the use of a fluorescent brightening agent as an ultraviolet absorbent is quite disadvantageous because the fluorescence emitted from the fluorescent brightening agent is recorded in blue and the scattered blue fluorescence spreads a haze in spite of the removal of ultraviolet rays. However, the preparation of color prints hardly involves this problem since it is performed under light containing only a small amount of ultraviolet rays. If the content of ultraviolet rays having a wavelength of below 400mμ poses a problem, an ultraviolet ray preventing filter is usually applied to the light source, and therefore, a printing operation, such as enlarging, does not suffer from the trouble of ultraviolet rays. The color fading of a print by indoor daylight containing an abundance of ultraviolet rays may pose a problem. In this case, however, even if the ultraviolet rays become fluorescence to form a blue to purple light source, the color fading effect is far weaker than ultraviolet rays. Rather, it has the merit of fluorescently brightening the white background. The prior art has known, of course, that in the last stage of development, a photographic material may be treated with a strong fluorescent brightening agent.

Therefore, the advantages obtained by the present invention are twofold. Firstly, the use of the fluorescent brightening agent as an ultraviolet absorbent does not adversely affect photographic emulsions. Secondly, color photographic papers prepared by applying the present invention rather obtain bleaching effects.

The present invention thus provides a composition for forming an ultraviolet absorbing filter layer comprising a dispersion in a hydrophilic binder of a complex formed between a fluorescent brightening agent containing an anionic group and being diffusible in an aqueous medium and a hydrophilic polymer containing a cationic nitrogen-containing active group, and also a photographic material containing this ultraviolet absorbing filter layer. The present invention makes it possible to utilize a fluorescent brightening agent as an ultraviolet absorbing filter suited for photographic material by complexing it with the hydrophilic polymer.

DETAILED DESCRIPTION OF THE INVENTION

The hydrophilic polymer containing a cationic nitrogen-containing active group will be described specifically. This active group may, for example, be an aliphatic amino group or heterocyclic amino group. Examples of the aliphatic amino group are alkylamino groups or alkanolamino groups such as trimethylamino group, triethylamino group, triethanolamino group, dimethylethanolamino group, other alkylamino groups, other alkanolamino groups, partially aromatic-substituted alkyl and/or alkanolamino groups. Examples of the heterocyclic amino groups include a guanidino group, pyridino group, piperidino group, piperazino group, morpholino group, and their amino-substitution products. Strongly basic groups containing a number of nitrogen atoms such as guanidino or aminoguanidino have a very high ability to form complexes. Cyclic amino groups such as pyridino, piperidino, piperazino or morpholino also have high activity and prove effective as such. However, their activities can be further enhanced by converting them to quaternized salts. On the other hand, aliphatic amino groups generally do not prove effective as such, but in many instances, become active only by being converted to quaternized salts, to attain a complex-forming ability.

Polymers having such cationic nitrogen-containing active groups are indefinite in number since the starting polymers contain a number of active groups and there are innumerable numbers of combinations of such cationic groups and the starting polymers. In addition, greater varieties of polymer can be considered depending upon the degree of polymerization, the degree of quaternization, the choice of groups to be introduced in quaternization, and in the case of vinyl polymers, copolymers of inactive monomers with monomers having effective active groups or monomers which will become active groups are also possible. It is impossible therefore to describe all of such numerous polymers in this specification. In view of the fact that many of these polymers containing cationic nitrogen-containing active groups are commercially available and well known as a fixing agent for dyes, a paper strength reinforcing agent, a precipitating agent, an agent for imparting electric conductivity or a specific binder which is soluble under acid conditions and insoluble under alkaline conditions, only some typical examples of the polymers containing cationic nitrogen-containing active groups, which are especially effective in the present invention, will be illustrated below. They are: poly-2-vinylpyridine (I), poly-4-vinylpyridinium methyl para-toluenesulfonic acid salts (II), polyvinyl-benzyl-trimethylammonium chloride (III), polyvinyl-benzyl-triethyl-ammonium chloride (IV), polyvinyl-benzyl-morpholium-methyl chloride (V), polyvinyl-benzyl-cyclohexyl-ammonium chloride (VI), polyvinyl-benzyl-picolinium chloride (VII), poly-4-vinyl-benzyl-triethanol-ammonium chloride (VIII), the methyl chloride salt of methylamino diethanol monoester of polymethacrylic acid (IX), the benzyl chloride salt of the dimethylamino-ethanol ester of polymethacrylic acid (X), poly(N,N-dimethyl-3,5-methylene-piperidinium chloride) (XI), the acetic acid salt of partially amino-guanido-modified polyvinylmethyl ketone (XII), the acetic acid salt of a partially amino-guanido-modified product of partially 2-keto-butylaldehyde-acetalized polyvinyl alcohol (XIII), and dialdehyde starch partially modified with aminoguanide (XIV). Their structural formulae are shown schematically below. In formula(I) to (XI), $n$ is an integer of about 10 to 2000. In formula (XII), $m$ and $n$ are positive integers, and ($m + n$) is an integer of about 10 to 2000. In formulae (XIII) and (XIV), , $m$ and $n$ are positive integers and ($l + m + n$) is an integer of about 10 to 2000.

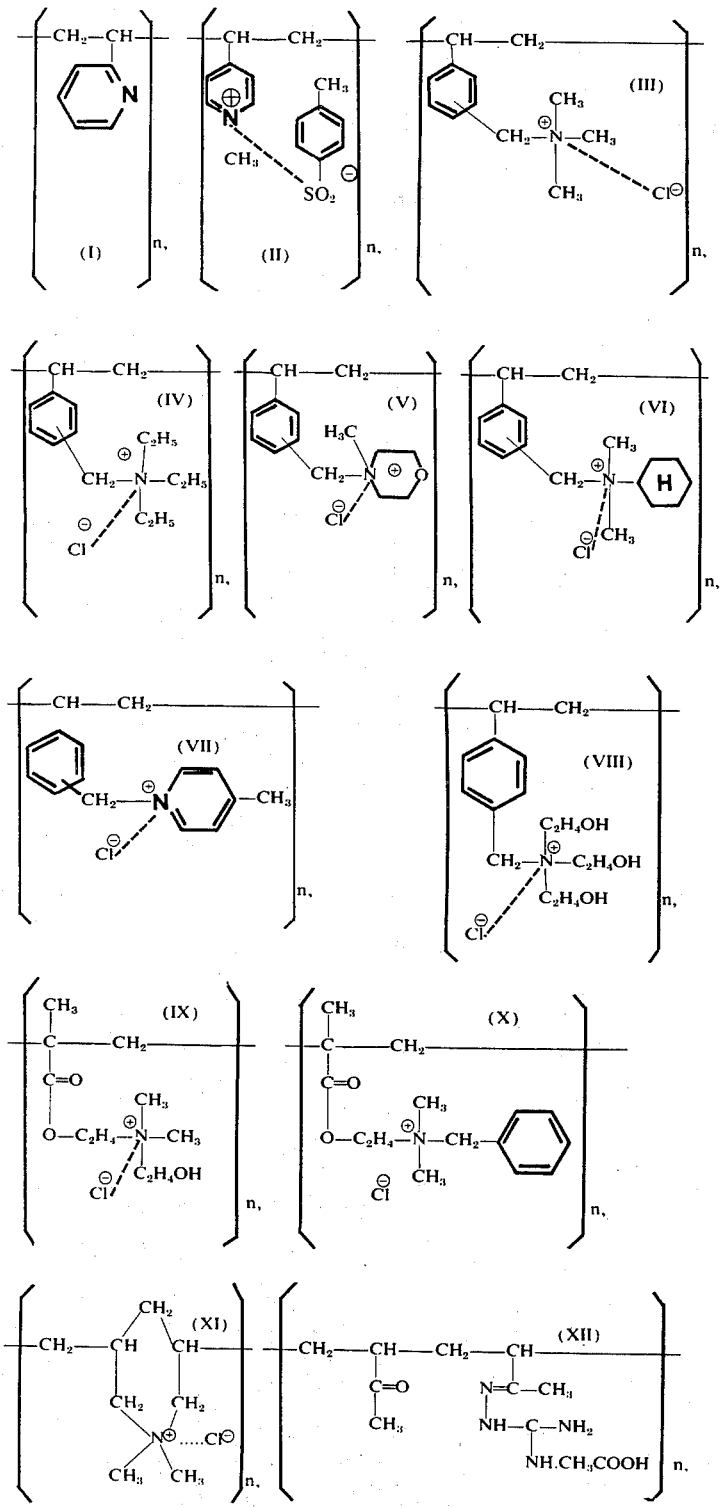

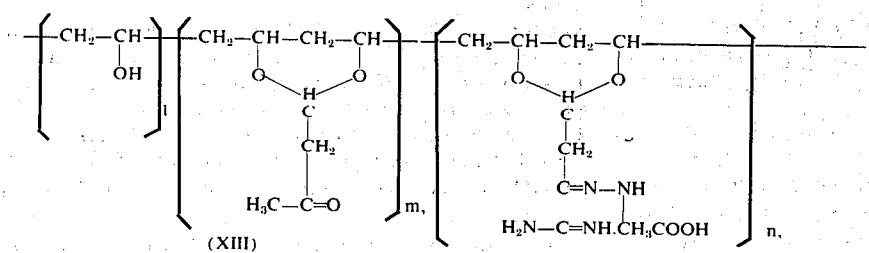

(XIII)

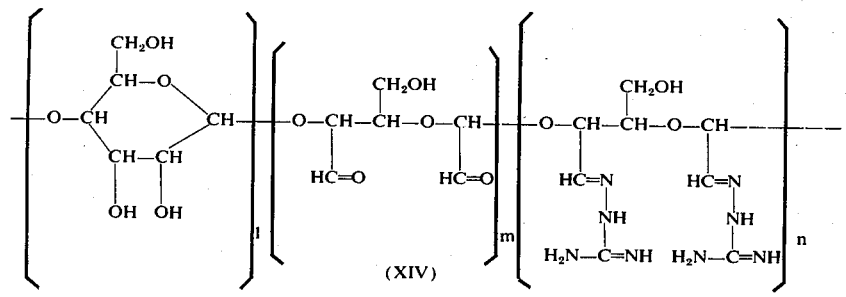

(XIV)

Polymer of formula (I) may also be converted to a quaternized salt. In polymers (II) to (XI), all nitrogens are converted to quaternized ammonium salts in the structural formulae shown, but it is not altogether necessary to quaternize all nitrogens. A number of different varieties of polymer can be formed, for example, by substituting other alkyl groups or aralkyl groups, or hydroxyalkyl groups for the alkyl groups or benzyl groups attached to the nitrogen atoms, or by varying the degree of polymerization, or by copolymerization with vinyl monomers as stated above. Furthermore, in polymers of formulae (XII) to (XIV), the properties thereof can be changed by the degree of modification with aminoguanide.

Many of these substances are commercially available and find a wide variety of applications, and it will not be necessary to describe methods of their production by referring to literature references. We will only describe below a method of preparing dialdehyde starch modified with aminoguanide of formula (XIV) since it is not so well known.

100 grams of commercially available dialdehyde starch (SUMSTAR—150, product of Miles Chemical Company, Inc., U.S.A.; degree of oxidation about 50%) was dispersed in 300 ml. of water, and the dispersion was heated to make it paste-like. A solution of 45 g of aminoguanidine hydrochloride in 450 ml of water was added to the paste-like product, and they were reacted with each other for 20 hours at room temperature. The product was filtered, washed with water and then with methanol, and dried at a temperature not higher than 40°C. There was obtained as a white powder dialdehyde starch of which about half of the total aldehyde groups were modified with aminoguanide. This product shows a high bonding power by forming a complex with an anionic dye or fluorescent brightening agent, and has the excellent property of not impairing the fluorescence of the fluorescent brightening agent. In addition, it has good misicibility with a hydrophilic polymer such as gelatin, polyvinyl alcohol or polyacrylamide, and also has hardending properties. Thus, it does not obstruct the hardening properties of the binder, and therefore, is a material which is most easy to use.

Generally, different kinds of hydrophilic polymers, for example, gelatin and polyvinyl alcohol, have bad miscibility with each other and even when they are mixed uniformly while hot, they frequently separate from each other upon cooling. Furthermore, it is difficult to mix one of them in a greater proportion than the other. Some of them, for example gelatin and gum arabic, combined under acid conditions to form a precipitate. The cationic polymers used in the present invention include those which, because of cationic properties, form precipitates together with an amphoteric polymer such as gelatin, and tend to agglomerate with a hydroxy-containing hydrophilic polymer such as polyvinyl alcohol. However, many of these cationic polymers can be mixed with the hydrophilic binder forming a photographic film, in an amount up to about 10 to 20% by weight based on the solids content of the binder, without causing the above-mentioned troubles. If the amount of the filter layer to be coated is about 5 g/m² (4% solution 125 ml/m²), the amount of the cationic polymer to be coated is 0.5 to 1 g/m². Where this polymer has sufficiently high ability to form a complex, and forms a complex with a fluorescent brightening agent in a weight ratio of 1:5 to 1:1, the limit of the amount of the fluorescent brightening agent to be incorporated in the filter layer is about 0.1 g/m² to 0.5 g/m² (assuming that the extreme limit 1 g/m² is not employed in actual operations). This concentration is sufficient for ordinary fluorescent bleaching effects and for use as an ultraviolet absorbing filter in color photographic paper. However, if for some special uses it is desired to increase the concentration of the fluorescent brightening agent in the filter layer to more than 0.5 g/m² and up to about 2 g/m² or if the cationic polymer has a low ability to form a complex and the fluorescent brightening agent can be combined with the polymer only in an amount less than 1/5 and up to about 1/10 of the weight of the polymer, the amount of the cationic polymer to be added to the binder should naturally be increased to more than 20%.

Generally, cationic nitrogen-containing polymers containing an ammonium salt group or pyridine salt group as an active group, if added to the binder in an amount above 20%, tend to cause the problems mentioned above (these problems will not occur with dialdehyde starch modified with aminoguanide which is miscible with a binder such as gelatin or polyvinyl alcohol in an unlimited amount). Therefore, in such an instance, it is recommended that the method disclosed in Japanese Pat. application No. 19759/70 relating to an improvement of mordanting using anionic dyes be used. This method comprises reacting a phthalic acid derivative of gelatin, polyvinyl alcohol or starch with a water-soluble nitrogen-containing cationic polymer in an aqueous solution using another water-soluble binder as a protective colloid to form coacervate particles having a particle size as fine as 0.1 to 10 microns, and complexing the coacervate particles with a fluorescent brightening agent having an anionic group and being diffusable in an aqueous medium, whereby the fluorescent brightening agent is rendered non-diffusible and fixed.

A specific example of the production of such a coacervate is shown in the Examples. As described in detail in Japanese Pat. application No. 19759/70, this method involves dissolving a phthalic acid derivative of gelatin, polyvinyl alcohol, starch or the like in water together with a water-soluble binder such as gelatin, pouring in a fine stream(s) of an aqueous solution of a nitrogen-containing cationic polymer, and stirring the mixture, to thereby form a stable suspension containing coacervate particles having a particle size of 0.1 to 10 microns. The conditions for forming a stable suspension differ according to the degree of modification of the phthalic acid derivative with phthalic acid or the type of the nitrogen-containing cationic polymer chosen, and the size of the coacervate particles also differs depending upon these factors. The preferred ratio of the phthalic acid derivative to the water-soluble binder is about 1:10 to 10:1, and the preferred reaction temperature is about 40° to 60°C. These ranges, however, are not critical.

The production of coacervate particles of the microcapsule type is described in Example 3. These coacervate particles can be made by a method similar to the method of producing coacervate particles described above in which a latex of a resin is incorporated in the water-soluble binder together with the phthalic acid derivative in a ratio, as solids content, of 1:10 to 10:1 to the binder, and then the nitrogen-containing cationic polymer is poured thereinto, followed by stirring, to form coacervate particles having a size of about 2 microns with latex particles as the nucleus.

By forming fine coacervate particles of the cationic polymer in this way and complexing them with a fluorescent brightening agent, a large quantity of the active polymer can be added to the binder without problems such as agglomeration or insolubilization. Therefore, the amount of the fluorescent brightening agent to be added can also be increased sufficiently.

As the hydrophilic binder used to form a photographic layer, gelatin has been widely used. Of late, however, various natural and artificial polymers have been used either alone or in combination. Examples of such polymers are starch, hydroxypropyl starch, gum arabic, polyvinyl alcohol, polyacrylamide, polyvinylpyrrolidone, a copolymer of styrene and maleic anhydride, a copolymer of vinyl methyl ether and maleic anhydride, hydroxyethyl cellulose, carboxymethyl cellulose, and ethyl cellulose. Any such or similar materials or combinations thereof may be used in the present invention.

Of the fluorescent brightening agents used in this invention, examples of those which have especially superior absorbability of ultraviolet rays, stability or fluorescent properties and which are most suitable for use in the present invention are Leucophoro B, Leucophoro R and Leucophoro BCF of Sandoz Ltd., Switzerland, Uvitex CF conc. PRS of Ciba Limited, Switzerland, Tinopal 2B of Geigy, Switzerland, and Blankophsre BP of Bayer AG, West Germany. Their structural formulae are not entirely clear, but they are assumed to be compounds of the stilbene type as expressed by the following formulae.

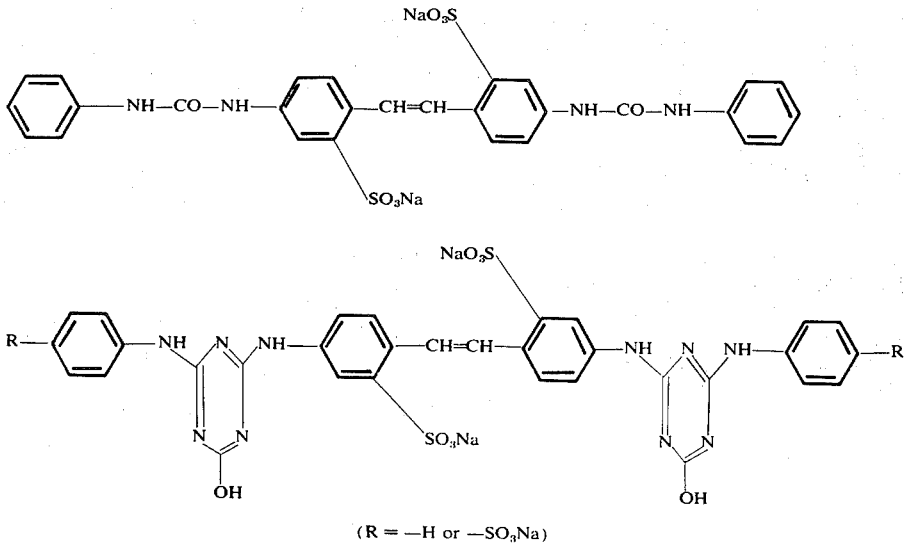

(R = —H or —SO₃Na)

Many compounds having similar structures are believed to have good properties.

In the present invention, the fluorescence of the fluorescent brightening agent after formation of a complex can be removed by the "quenching effect" by appropriate selection of the type of the polymer containing a cationic nitrogen-containing active group. Accordingly, if desired, an ultraviolet absorbing filter completely free from fluorescence can be prepared. For example, cationic nitrogen-containing polymers of formulae (I), (II) and (VII) given above completely lose fluorescence or have extremely reduced flluorescence by quenching during the formation of complexes with Leucophoro B or Tinopal 2B. The polymer of formula (V) has a somewhat reduced fluorescence, and polymers (IV), (X) and (XIV) retain very strong fluorescence. With polymers of formulae (III), (V) and (XI), the color of fluorescence changes from blue purple to pure blue or blue green. This color changing effect is very advantageous since while a strong fluorescent brightening agent of this kind is frequently disliked because of its reddish color, and blue to blue green fluorescent brightening agents are desired, no strong fluorescent brightening agent of such desired colors has been available so far. Such a fluorescence color changing effect is effectively utilized in an ultraviolet absorbing filter, especially in a color photographic paper.

The advantages of the present invention over the prior art are as follows:

1. Unlike oleophilic ultraviolet absorbents of the oil dispersion type, there is no restriction with respect to solubility, crystallinity, or stability in oil, etc., and many commercially available fluorescent brightening agents can be used freely;

2. The invention is based on a modification of the Fischer method, and the stability of the ultraviolet absorbent is high.

3. Unlike the conventional method in which the fluorescent brightening agent is dissolved in an oil and the solution obtained is dispersed in a binder, the physical properties of the binder layer are not impaired, and the filter layer has good adhesion with other layers and also has good hardening properties.

4. Unlike a dispersion of oil, the filter layer of this invention barely scatters light, and even when coated as a topmost layer the luster of the photographic material is not impaired.

5. Since a fluorescent brightening agent is used, the absorption end of long wavelengths (400 to 420 m$\mu$) is generally sharply cut and the filter layer is barely colored yellow. In addition, the layer mostly has strong fluorescence, and therefore, it is especially suitable for use in color photographic paper.

6. By properly selecting the polymer having a cationic nitrogen-containing active group, the complexed fluorescent brightening agent can easily be converted to one free from fluorescence.

7. By selecting the active polymer properly, the color of fluorescence can be changed from blue purple to pure blue or blue green.

The invention will be more specifically illustrated by the following Examples which in no way limit the invention.

EXAMPLE 1

100 g of partially aminoguanide-modified dialdehyde starch obtained by modifying about half of all the aldehyde groups of dialdehyde starch (commercially available, degree of oxidation 50%, as described hereinabove) was dispersed at low temperatures in a solution of 20 g of Uvitex CF conc. PRS in 5 liters of water, and well stirred. The stirred mixture was allowed to stand for slightly more than 10 hours at a relatively low temperature (10° to 15°C.), then suction filtered, washed with water and dried to yield a fluorescent granular product which was colored light yellow. One gram of this product corresponded to 0.2 g of Uvitex CF. It is not soluble in cold water, but if heated upon the addition of a small amount of sodium hydroxide to adjust the pH to 7–7.5, it becomes paste-like and is dissolved. This product can be used as a binder, and mixed with gelatin in an optional proportion up to an equal amount. By the action of the remaining dialdehyde groups, an ultraviolet absorbing filter having good hardening properties can be obtained.

In the production of color photographic paper using multilayers of emulsions developing three primary colors by a standard method, the three emulsion layers were coated together with interlayers. A mixture in equal amounts of a 5% aqueous solution of the above-mentioned fluorescent product and a 5% aqueous solution of gelatin was coated on top of these layers at a rate of about 100 ml. per square meter. A 2% gelatin solution was coated over the layer by a standard method at a rate of about 50 ml/m². Since this ultraviolet absorbing filter layer contained about 0.5 g of Uvitex CF per square meter, its ultraviolet absorption was good and could sufficiently reduce color fading, upon exposure to light, of the developed photographic image. In addition, owing to the fluorescent effect, the white background was pure white and bright, and the photographic material thus obtained was far superior to that obtained by coating an ordinary non-fluorescent ultraviolet absorbent dispersed in oil which is yellowish as a whole.

EXAMPLE 2

Three grams of commercially available phthalic acid-modified gelatin (Special gelatin 2567 of LEINER Inc. Britain; it is said that this gelatin is produced by substituting phthalic acid for 98% of the epsilon-amino groups in gelatin molecules) was dissolved in 60 ml. of water together with 4 g of gelatin for photographic use, and the pH of the solution was adjusted to 6.0. A solution of 3.0 g of the benzyl chloride salt of polymethacrylic acid dimethylamino-ethnol ester (compound of formula (X) given hereinabove) in 30 ml. of water at 50°C. was poured into the resulting solution in the form of fine streams, and the mixture was stirred. There was formed a stable suspension containing coacervate particles having a particle size of not more than one micron. 6 ml. of 10% formaldehyde solution was added to the suspension to harden the coacervate, and the mixture was further stirred for one hour at the same temperature. This solution (about 100 ml) was thoroughly cooled, and then allowed to stand overnight in a refrigerator to coagulate it. The product was cut finely into noodles, and placed in a cold solution (10°–15°C) of 2.0 g of Tinopal BOP in 500 ml. of water, and with gentle stirring, the mixture was allowed to stand for one hour to sufficiently form a complex. Standing was followed by washing with cold water (10°–15°C) for one hour to remove impurities. After squeezing off water, the product was dissolved by heating it together with 5 g of gelatin to make the total amount 300 ml. It was assumed that the amount of the binder contained was about 15 g as a total, and about 2.0 g of the fluorescent brightening agent remained as a complex. In the same manner as in Example 1, the resulting product was coated in an amount of about 100–120 ml/m$^2$ as an ultraviolet absorbing filter layer together with an over layer in the production of color photographic paper.

In this case, the concentration of the fluorescent brightening agent as an ultraviolet absorbent was about 0.7 g/m$^2$, and even if it is diluted with a gelatin solution to twice its volume, it is a sufficiently effective filter layer.

A photographic layer consisting mainly of gelatin has high shrinkage after drying and tends to curl and become brittle. Therefore, in recent years, photographic layers used in photographic materials usually include a latex of a soft hydrophobic polymer prepared by emulsion polymerization such as a polyacrylate, polymethacrylate or a copolymer of butadiene with acrylonitrile to soften the film, prevent cracks, and reduce the tendency to curl. Accordingly, the size of coacervate particles can be more easily controlled by incorporating such a latex into the gelatin solution during the formation of a coacervate, and treating it in the manner described in the next Example to form a coacervate of the microcapsule type in which these oily praticles are made the nucleus and enveloped with a shell of gelatin.

EXAMPLE 3

3 g of the same gelatin modified with phthalic acid as was used in Example 2 and 3 g of photographic gelatin were dissolved in a mixture of 30 ml. of a latex of polybutylacrylate (resin content 20%) and 60 ml. of water, and pH of the mixed solution was adjusted to 6.0. A solution of 3.0 g of polyvinylbenzyl-morpholium-methyl chloride (compound of formula (V)) in 50 ml. of water (both at 50°C) was poured in the form of fine streams into the mixed solution, and the mixed solution stirred to form coacervate particles in which latex particles were nuclei. The size of the coacervate particles was about 2 microns with size being very uniform. 6 ml of a 10% formaldehyde solution was added, and the mixture was further maintained at the same temperature for one hour. The solution (about 150 ml) was then cooled, and coagulated.

The resultant gelled product was cut into fine process and immersed in a cold solution of 2.0 g of Tinopal BOP in 500 ml of water in the same manner as set forth in Example 2 to sufficiently form a complex. After washing with water, the complex was dissolved by warming to make the total amount 300 ml. This product contained about 15 g of the binder including the hydrophobic latex, and it was assumed that about 2 g of the fluorescent agent completely remained. When in the production of color photographic paper the resulting product was coated in an amount of about 100 g/m$^2$ as an ultraviolet absorbing filter layer, the thickness of the layer upon drying was about 4.5 microns, and this layer contained about 0.7 g/m$^2$ of the fluorescent brightening agent. Thus, it showed excellent ultraviolet absorbing property, and the fluorescence was blue without any reddish shade. This ultraviolet absorbing filter layer maintains the white background of the finished color print comfortably bright, and reduces color fading upon exposure to light. In this case, the three color forming emulsion layers and the interlayers also included the latex of poly(butyl acrylate) to a similar extent, as a matter of course. By this procedure, there can be obtained color photographic paper coated with films of excellent softness, rapid drying property and adherence, and the finished color print is completely free from a tendency to curl.

EXAMPLE 4

50 g of commercially available soluble starch was reacted with 37.5 g of sodium acetate anhydride using 200 ml of formamide as a catalyst at a temperature not higher than 60°C. for one hour to form a phthalic monoester of starch. This was precipitated in 1.2 liters of acetone, and by washing with methanol and acetone, was obtained as a white powder (yield about 87g, about 70% of the carboxylic acid group being the sodium salt). The degree of substitution was 35% (containing 1.05 of phthalic acid residual groups per unit of glucose, on an average). 5 g of this product and 5% gelatin were dissolved in 150 ml. of water. The pH of the solution was adjusted to 6.5, and the solution was heated at 50°C.

100 ml. of a 5% aqueous solution of poly-4-vinylpyridine methyl chloride salt (II) (pH 6.5) which had been separately prepared was poured into the resulting solution with careful stirring. Immediately, coacervate particles having a particle size of 2 to 3 microns formed. 10 ml. of a 10% formaldehyde solution was added, and the mixture was heated at the same temperature for one hour to harden and stabilize the coacervate particles. 5g of gelatin was additionally dissolved (total amount about 200 ml., the concentration of the total binder 8.75%). There was obtained a dispersion of coacervate particles protected with gelatin, which was cooled and gelled, and stored in a refrigerator.

The gel was taken out as desired, and in the same manner as is used to form photographic emulsions, was attenuated in noodle form. The noodles were put into a nylon net bag of coarse mesh about that of gauze. The bag was suspended in a solution of 2.0 g of Leucophoro BCF in one liter of water (the amounts being based on the total amount of 200 ml. of the noodles), and occasionally moved to form a complex over a period of one hour. The temperature was maintained at 10°–20°C. The fluorescent brightening agent was combined with the cationic polymer in the coacervate almost completely. The fluorescence was removed at this time by quenching, and the noodles were colored light yellow. The noodles were later washed with cold water to remove impurities, and dissolving by heating. In the manufacturing process of a color print material to be coated on a film base, the solution of the noodles was coated at a rate of about 100 g/m$^2$ as an ultraviolet absorbing filter layer together with an overlayer in the final stage of production.

The concentration of the ultraviolet absorbent in this filter layer was as high as 1 g/m². Using this material, a large-sized display color print for advertisement purposes to be used by transmission illumination was produced, and its color fading upon exposure to outdoor light was prevented without coating the ultraviolet absorbing filter anew. Since in transmission illumination the emission of fluorescence makes it difficult to see the advertisement, a filter layer free from fluorescence is especially advantageous. Of course, this ultraviolet absorbing filter layer can be used in the preparation of color photographic materials as in Examples 1 and 2, and has the same effect as in the case of using a conventional non-fluorescent ultraviolet absorbent. It has good storage stability and does not impair the luster or the strength of the film.

EXAMPLE 5

100 g of polyvinyl alcohol having a degree of polymerization of about 500 (kurare Poval 105, commercial grade) was disperse in one liter of glacial acetic acid in a three-necked flask equipped with a silica tube, and 250 g of phthalic anhydride, 300 g of maleic anhydride and 75 g of sodium acetate anhydride were added. While stirring, these components were reacted at 95°C. for 10 hours. The product was poured into 8 liters of acetone to precipitate it. Filtration and washing with acetone, followed by drying, gave 450 g of pure white powder. It is difficult to measure the esterification degree of the product precisely, but it is calculated to be composed of about 30% of phthalic monoester and about 10% of maleic monoester.

This product was not soluble in water under acid conditions but become soluble if neutralized with alkali. 5 g of this product was dissolved in slightly alkaline water and the pH of the solution was adjusted to 6.5 This solution was mixed with a separately prepared 10% gelatin solution in an amount of 100 ml. The resulting mixture was heated at 50°C. and vigorously stirred, during which 100 ml. (at room temperature) of a separately prepared 5% aqueous solution of polyvinyl-benzyl-triethyl-ammonium chloride (compound of formula (IV) given hereinabove) was poured thereinto. Immediately, coacervate particles having a particle size of 2 to 3 microns formed. The coacervate liquid was heated at 50°C. for 10 hours to perform crosslinking by the maleic acid residues, to thereby sufficiently harden and stabilize the coacervate particles. 10 g of gelatin was also added and dissolved therein. Of the 30 g of binder dissolved in about 300 total ml. of the solution, 20 g was gelatin, and in a continuous phase of gelatin, 10 g of the coacervate particles was dispersed. When this solution was cooled, it coagulated to a tough gel. The gel was attenuated into noodles, and put into a nylon gauze bag, followed by suspension at a low temperature (10° to 15°C.) in an aqueous solution of 5 g of Leucophoro BCF in one liter of water to form a complex in the course of slightly more than one hour. The complex obtained was washed with cold water, and warmed to dissolve it to make the amount 400 ml. It was then coated as an ultraviolet absorbing filter layer on the top of a color photographic paper, or as an interlayer, at a rate of about 100 ml/m². The concentration of the absorbent on the finished color photographic paper was about 0.75 g/m².

EXAMPLE 6

A coacervate was formed in the same way as in Example 5. Then, instead of adding 10 g of gelatin, a dispersion of 3 g of Leucophoro B in a solution at a pH of 6.0 of 7 g of polyvinyl alcohol and 3 g of a copolymer (PVM/MA for short) of vinyl methyl ether and maleic anhydride in 100 ml. of water was added. The mixture was stirred at 50°C. for slightly more than one hour to complex the fluorescent brightening agent with the coacervate particles (the total amount of mixture being about 400 ml.).

Without washing with water, the resulting complex was uniformly coated on the surface of an ordinary processed color print at a rate of about 100 g/m² to form an ultraviolet absorbing filter layer which concurrently acted as a color fading inhibitor and a fluorescent brightening agent. This filter layer did not contain a latex of soft resin as did the filter layer obtained in Example 3, but by the inclusion of polyvinyl alcohol and PVM/MA, the water-absorption was reduced and the equilibrium water content was small. Accordingly, even when it was coated on top of a print it did not become hard, but produced an effect which might be obtained by coating a lacquer. However, since the print tends to be difficult to see because of the appearance of luster, a mixture of 15 g of colloidal silica powder ("SYLOID 308", product of Fuji-Davidson Company) with 400 ml. of this solution is more conveniently used as a protective film, which provides a dry delustering (matte) finish. Not only is the ultraviolet absorbing filter layer effective for preventing color fading of a color print which is to be hung for long periods of time in a bright room, but also it can prevent yellowing of the white background of a black-and-white silver print which is caused by exposure ultraviolet rays over long periods of time.

Of course, a color photographic paper containing an ultraviolet absorbing filter layer can be produced by coating this solution during the production of the color photographic paper. In this case, however, it is desirable to use gelatin, polyvinyl alcohol and PVM/M A in the emulsion layers and interlayers.

EXAMPLE 7

20 g of yellow fluorescent powder (the complex of aminoguanidemodified dialdehyde starch with Uvitex CF, as obtained in Example 1) was dissolved in one liter of water together with 20 g of gelatin to form a coating solution for an ultraviolet absorbing filter layer. This solution was used instead of ordinary coating solutions for interlayers or overlayers, and a color printing paper was produced in accordance with standard multilayer emulsion coating methods. Specially, each of the emulsion layers was coated at a rate of 100 g/m², and the interlayers were applied at a rate of about 50 g/m². An emulsion layer / interlayer or overlayer pair was coated in one operation and this was repeated three times to form the color photographic paper. In this operation, the non-emulsion layer coated in the last place was an over layer, and the other two coatings were interlayers. All of these three layers are ultraviolet absorbing filter layers in accordance with the present invention. The total amount of coating in the undried state was 150 g/m², and the amount of the ultraviolet absorbent coated in each layer was 0.2 g/m², the total amount of the ultraviolet absorbent in the three layers being 0.6 g/m². The protection to the uppermost layer was somewhat weak, but the protective power to the lowermost layer was larger than in the case of Example 1. Since the base of photographic paper was white and reflects light, strong light acts from both surfaces of the emulsion layer. In this case, the absorption of ultraviolet rays of the reflected light was the same as in Example 1. Thus, while a color photographic paper now in common use which contains an ultraviolet absorbent filter layer of the oil dispersion type has the filter layer only in one layer immediately below the topmost emulsion layer, the color photographic paper produced according to the present invention has the advantage that the lower layer can be similarly protected and the uppermost layer receives a superior protective effect due to the ultraviolet absorbing layer containing 0.2 g/m² of the complex. In addition, no special step of coating the ultraviolet absorbing filter layer is necessary, but the color photographic paper according to this invention can be produced by the same manufacturing steps as in the case of the conventional color photographic paper which lacks a filter layer. Accordingly, the cost of production is low, the luster of the paper is good, and the physical properties of the interlayer or overlayer are strengthened by the hardening effect off the dialdehyde groups.

While the invention has been described in detail and in terms of specific embodiments thereof, it will be apparent that various changes and modifications can be made therein without departing from the spirit and scope thereof.

What we claim is:

1. A composition for forming an ultraviolet absorbing filter layer comprising a dispersion in a hydrophilic binder, said hydrophilic binder being at least one member selected from the group consisting of gelatin, phthalic acid-modified gelatin, starch, hydroxypropyl starch, gum arabic, polyvinyl alcohol, polyacrylamide, polyvinyl pyrrolidone, a copolymer of styrene and maleic anhydride, a copolymer of vinyl methyl ether and maleic anhydride, hydroxyethyl cellulose, carboxymethyl cellulose, ethyl cellulose, and mixtures thereof, of a complex formed between a stilbene type fluorescent brightening agent containing an anionic group, which is diffusible in an aqueous medium, and a hydrophilic polymer selected from the group consisting of p-olyvinyl-benzyl-trimethyl-ammonium chloride, polyvinyl-benzyl-triethyl-ammonium chloride, polyvinyl-benzyl-morpholium-methyl chloride, polyvinyl-benzyl-cyclohexyl-ammonium chloride, polyvinyl-benzyl-picolinium chloride, poly-4-vinyl-benzyl-triethanol-ammonium chloride, the methyl chloride salt of methylamino diethanol monoester of polymethacrylic acid, the benzyl chloride salt of the dimethylaminoethanol ester of polymethacrylic acid, and poly(N, N-dimethyl-3,5-methylene-piperidinium chloride.

2. The composition of claim 1, which is prepared by reacting a phthalic acid derivative of gelatin, polyvinyl alcohol or starch with the hydrophilic polymer in an aqueous solution of the hydrophilic binder to form fine particles of coacervate, and then complexing the fluorescent brightening agent with the resulting coacervate particles.

3. The composition of claim 2, wherein the coacervate is formed after incorporation of a latex of a hydrophobic polymer in the aqueous solution of the hydrophilic binder, thereby to form microcapsule-type coacervate particles.

4. The composition of claim 1, wherein the content of the fluorescent brightening agent in the filter layer is from 0.1 to 2 g per square meter of the filter layer.

* * * * *